Patented Dec. 26, 1939

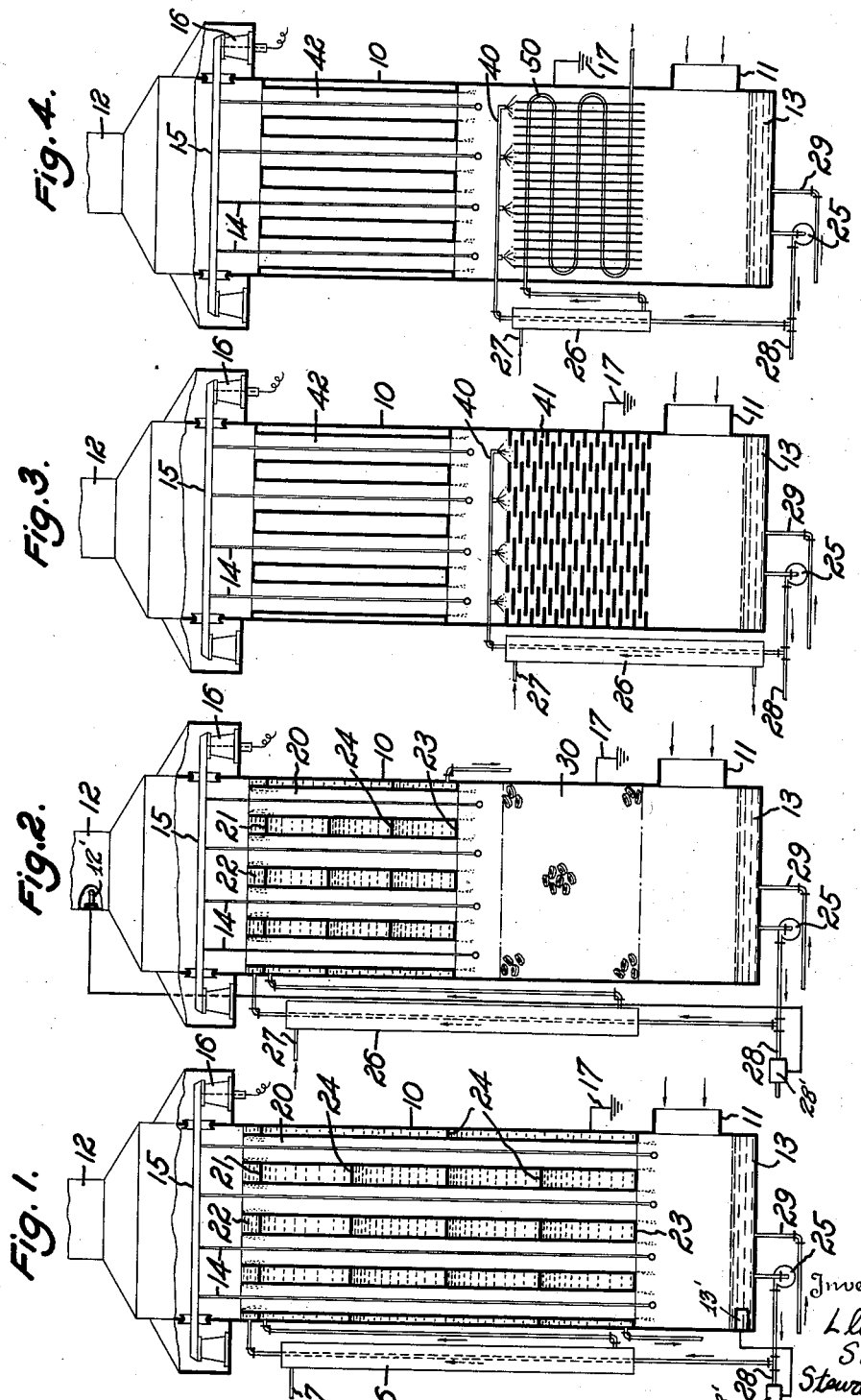

2,184,782

UNITED STATES PATENT OFFICE 2,184,782

AIR CONDITIONING

Lloyd N. Scott, New York, N. Y., and Stewart C. Coey, Glen Ridge, N. J., assignors to Research Corporation, New York, N. Y., a corporation of New York Application March 24, 1938, Serial No. 197,934

6 Claims. (Cl. 183—7)

The present invention relates to the conditioning of gases, particularly air. It is especially directed to a method and apparatus whereby air may be completely conditioned in a single operation and by means of a unitary apparatus.

The complete conditioning of air should include the adjustment of the temperature and the humidity of the air to a predetermined level or range of conditions and the substantially complete removal of suspended particles of dust, mist and the like, together with the removal of all foreign substances introduced in the course of the conditioning operation.

A principal purpose of the invention is the provision of a method and means by which the temperature and humidity of air can be adjusted and suspended material can be removed therefrom.

A further object is the provision of apparatus which will supply air of predetermined temperature and humidity and substantially freed from suspended material and entrained substances.

Another object is the provision of a method and means whereby air may be subjected simultaneously or in immediate succession to temperature adjusting means, humidity adjusting means, and means for the removal of suspended particles.

The method of the invention broadly comprises contacting air or other gas with an extended surface of a hygroscopic liquid of predetermined and substantially constant concentration while maintaining the hygroscopic liquid at a substantially constant predetermined temperature, and simultaneously or in immediate succession subjecting the air to a high tension electric field to remove therefrom the hygroscopic liquid, together with any other suspended or entrained material.

The invention will be more particularly described for the purpose of illustration with reference to the accompanying drawing in which Figs. 1, 2, 3 and 4 are diagrammatic sectional elevations of four different embodiments of the invention.

In each of the embodiments there is shown a casing 10 provided with inlets 11 and outlets 12 for the air or other gas to be treated, and having sumps 13 at the bottom. The apparatus shown in each of the figures is provided with attenuated discharge electrode members 14, supported from bars 15 and connected through insulating bushings 16 to a source of high tension current (not shown). The casings 10 are connected to a terminal of the high tension current source either directly or by grounding, as indicated at 17.

In the embodiment shown in Fig. 1, each of the discharge electrode members is positioned in a cylindrical member 20 forming a conduit for the flow of gas along the discharge electrode and providing a complementary extended surface electrode for the collection of particles precipitated out of the gas by the action of the electric field between the attenuated electrode and the extended surface electrode.

A header 21 positioned below the upper ends of members 20 forms reservoir 22 surrounding the upper ends of the conduits. A sheet 23 joins the lower ends of the members 20 with the casing 10 and the space between sheet 22 and header 21 is divided by horizontal partitions 24 alternately ending short of one side and the other of the casing to provide a tortuous path for the flow of fluid through the space surrounding the conduits 20.

In the operation of the apparatus, a stream of air is caused to flow upwardly through conduits 20. A deliquescent liquid, such as a solution of calcium chloride, is circulated by means of pump 25 from sump 13 to reservoir 22, whence it overflows over the inner surfaces of conduits 20 and into the air stream flowing up through the conduits. A cooling fluid, for example, water from a cooling tower is passed into heat exchanger 26 at 27 where it preliminarily cools the hygroscopic liquid to the predetermined temperature and then passes through the space between conduits 20 where it serves to maintain the hygroscopic liquid flowing down the inner surfaces of the conduits at the predetermined temperature by carrying away the latent and sensible heat absorbed by the hygroscopic liquid from the air in contact therewith. The concentration of the hygroscopic liquid is maintained substantially constant at a point corresponding to a predetermined vapor pressure of the solution or relative humidity of gas in contact therewith by pumping a portion of the liquid at 28 to a concentrating device, not shown, when it returns by pipe 29. The proportion of the liquid passed to the concentrator may be controlled by a concentration-sensing device 13' in sump 13 governing valve 28', or by a humidity-sensing device 12' in outlet 12 governing valve 28' as shown in Fig. 2, or by any other suitable control means.

It will be seen that the air passing through the apparatus is simultaneously brought to a condition of temperature and humidity determined by the temperature of the cooling fluid and the concentration of the hygroscopic liquid, respectively, supplied to the apparatus, while the electric field between the attenuated electrodes and the inner surfaces of the conduits eliminates suspended particles from the air and causes any of the deliquescent liquid overflowing the upper ends of the conduits, which may be entrained by the air, to be precipitated on the inner surface of the conduits to form a film or layer offering an extended surface of contact to the air. The air leaving the apparatus is thus cleaned and purified and brought to predetermined conditions of temperature and humidity.

While the operation has been described more particularly in terms of cooling and dehumidifying the air, the method and apparatus are equally capable of use for warming or humidifying the air, or the air may be cooled and humidified, or warmed and dehumidified. For example, for warming and humidifying air in winter, it is only necessary to supply hot water or steam at 27, while providing for the addition of sufficient water to the deliquescent solution to maintain its concentration at equilibrium with the desired relative humidity of the air.

In the embodiment of Fig. 2, an upper section is provided with cylindrical conduits 20, forming collecting electrodes and providing a space for cooling fluid therebetween, and a reservoir for deliquescent liquid at the top as in Fig. 1. Below the top section there is provided a section containing extended surface packing material 30, such as Raschig rings.

In this embodiment the air comes into contact with a large surface of hygroscopic liquid in the lower packed section wherein a substantial proportion of the temperature and humidity adjustment is effected. The final adjustment to the desired temperature and humidity is then brought about in the upper section wherein the removal of suspended and entrained material from the air is also effected. Additional cooling may be provided in the lower section if desired, for example, by providing cooling coils in the packing material.

In the embodiments shown in Figs. 3 and 4, the air is brought substantially completely to the desired temperature and humidity in a lower section providing an extended surface over which hygroscopic liquid of controlled temperature and concentration is circulated in contact with the air. The air is then subjected to a high tension electric field which removes the suspended and entrained material therefrom.

In Fig. 3, the hygroscopic liquid is sprayed from spray devices 40 over extended surface material, which is shown as staggered shelves 41, but may take any other form which provides a large surface of gas and liquid contact. In this form of the invention, the cooling of the hygroscopic liquid to the desired temperature is effected entirely in counter-current heat exchanger 26.

In the upper portion of the apparatus there is provided collecting electrode surfaces, shown as pipes 42, surrounding the discharge electrode members 14. The entrained deliquescent liquid carried into this section of the apparatus by the air is precipitated on the inner surfaces of pipes 42 and forms a film of extended surface ensuring substantial completion of the equilibrium between the air and the hygroscopic liquid at the concentration and temperature at which it is supplied to the sprays 40.

In the apparatus of Fig. 4, additional cooling in the lower part of the apparatus is effected by providing finned coils 50, immediately below sprays 40, and passing cooling fluid therethrough. These coils also provide the extended surface desired for effective contact of the air and hygroscopic liquid. The upper portion of the apparatus of Fig. 4 is identical with that of Fig. 3.

The embodiments shown schematically in Figs. 1-4 are merely illustrative of the wide variety of form and arrangement which is possible without departing from the spirit of the invention and many other such variations are possible. For example, in the apparatus of Fig. 1, the hygroscopic liquid might be sprayed upwardly through the paths between the complementary electrodes instead of being caused to flow down from the top.

While in each of the figures the air is shown flowing upwardly through the apparatus, which is in many respects the most desirable method of operation, by suitable rearrangement of the elements of the apparatus provision may be made for downflow or horizontal flow of the air.

The collecting electrode members may be in other forms than pipes. For example, they may be in the form of plates, dividing the casing of the apparatus into conduits of rectangular cross-section, with spaces therebetween for the circulation of cooling fluid when this is desired.

We claim:

1. Apparatus for conditioning air comprising a casing, a plurality of members in said casing providing conduits for the flow of air therethrough, discharge electrode members in said conduits, means for providing an electric potential between said discharge electrode members and said conduit members, means for the exchange of heat between said conduits and a heat transfer fluid, and means providing a flow of hygroscopic liquid adjacent the inner surfaces of said conduits.

2. Apparatus for conditioning air comprising a casing, a plurality of members in said casing providing conduits for the flow of air therethrough and cooperating with said casing to provide a path for the flow of heat transfer fluid in contact with the outer surface of said members, discharge electrode members in said conduits, means for providing an electric potential between said discharge members and said conduit members, and means providing a flow of hygroscopic liquid adjacent the inner surfaces of said conduits.

3. Apparatus for conditioning air comprising a casing, a plurality of members in said casing providing conduits for the flow of air therethrough and cooperating with said casing to provide a path for the flow of heat transfer fluid in contact with the outer surface of said members, discharge electrode members in said conduits, means for providing an electric potential between said discharge members and said conduit members, means providing a flow of hygroscopic liquid adjacent the inner surfaces of said conduits, and means for the exchange of heat between said hygroscopic liquid and a heat transfer fluid.

4. Apparatus for conditioning air comprising a casing, a plurality of members in said casing providing conduits for the flow of air therethrough and cooperating with said casing to provide a path for the flow of heat transfer fluid in contact with the outer surface of said members, discharge electrode members in said conduits, means for providing an electric potential between said discharge members and said conduit members, a plurality of extended surface contact members in said casing, means providing a flow of hygroscopic liquid adjacent the inner surfaces of said conduits and over said extended surface contact members, and means for inducing a flow of air successively past said extended surface contact members and through said conduits.

5. Apparatus for conditioning air comprising means forming a conduit for the flow of air therethrough, a discharge electrode member positioned in said conduit, means providing an electric potential between said discharge electrode member and the means forming said conduit, means providing a flow of hygroscopic liquid adjacent the walls of said conduit in contact with the air flowing therethrough, and means providing a flow of heat transfer fluid adjacent the walls of said conduit out of contact with the air flowing therethrough.

6. A method of conditioning air which comprises passing the air through a conduit, establishing a flowing film of hygroscopic liquid of predetermined concentration adjacent the inner surface of said conduit, contacting surfaces of said contact not in contact with the air being conditioned with a heat transfer fluid whereby to maintain said hygroscopic liquid at a substantially constant predetermined temperature, and establishing a high tension electric field in said conduit extending at least to said film of hygroscopic liquid.

LLOYD N. SCOTT.
STEWART C. COEY.